(12) United States Patent  
Chen

(10) Patent No.: US 8,837,046 B2  
(45) Date of Patent: Sep. 16, 2014

(54) PROJECTION SCREEN AND PROJECTION SYSTEM THEREOF

(71) Applicant: National Tsing Hua University, Hsinchu (TW)

(72) Inventor: Cheng-Huan Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/683,768

(22) Filed: Nov. 21, 2012

(65) Prior Publication Data

US 2014/0085718 A1 Mar. 27, 2014

(30) Foreign Application Priority Data

Sep. 25, 2012 (TW) .............................. 101135060 A

(51) Int. Cl.
*G03B 21/56* (2006.01)
*G03B 21/60* (2014.01)

(52) U.S. Cl.
USPC .......................................... 359/449; 359/459

(58) Field of Classification Search
USPC ......................................... 359/449, 459, 460
See application file for complete search history.

(56) References Cited

U.S. PATENT DOCUMENTS

| | | | | |
|---|---|---|---|---|
| 7,286,101 B2 * | 10/2007 | Hosaka | ......................... | 359/459 |
| 7,324,277 B2 * | 1/2008 | Choi | ............................. | 359/452 |
| 7,495,829 B2 * | 2/2009 | Peterson et al. | ............. | 359/459 |
| 7,777,944 B2 * | 8/2010 | Ho et al. | ....................... | 359/443 |
| 2004/0100692 A1 * | 5/2004 | Hou | ................................. | 359/452 |
| 2007/0047076 A1 * | 3/2007 | Fricke et al. | ................. | 359/443 |

* cited by examiner

*Primary Examiner* — Christopher Mahoney

(74) *Attorney, Agent, or Firm* — Muncy, Geissler, Olds & Lowe, P.C.

(57) ABSTRACT

A projection screen includes a substrate having a projection area for a projection device to project an image onto the projection area. The projection area includes a plurality of arrayed optical regions, and each pixel of the image corresponding to the at least one optical region. Each of the optical regions includes a first optical sub-region and a second optical sub-region with different optical characteristics, such as reflective scattering, transmissive scattering, simple transmission or specular reflection. The above-mentioned projection screen with the optical characteristics of two or more, for example, can be at the same time as the front projection screen and the rear projection screen, or allows the user to watch background image behind the projection screen. A projection system including the above-mentioned projection screen is also disclosed.

14 Claims, 4 Drawing Sheets

PROJECTION SCREEN AND PROJECTION SYSTEM THEREOF

BACKGROUND OF THE INVENTION

1. Field of the Invention

The present invention relates to a projection screen and a projection system, and more particularly to a projection screen and a projection system with various optical characteristics.

2. Description of the Prior Art

Conventional projection screens are divided into front projection screens and rear projection screens with different optical characteristics respectively. Projection screens have an optical characteristic of reflective scattering and rear projection screens have an optical characteristic of transmissive scattering. For both types of screens, they are not transparent, that is to say, users cannot view the background from the other side of the projection screen. Therefore, usage of the projection screens is restricted. For example, when showcase glass is used as a projection screen, displays inside the showcase cannot be viewed by outside consumers.

Thus, finding an effective method for changing optical characteristics of projection screens to enrich usage thereof is the current target.

SUMMARY OF THE INVENTION

The present invention is directed to a projection screen, wherein at least one optical region is corresponding to one pixel of the image projected on the projection area, and each of the optical regions comprises at least two optical sub-regions and each of them has different optical characteristic such as reflective scattering, transmissive scattering, simple transmission or specular reflection. As a result, the projection screen of the present invention can be used as a front projection screen and a rear projection screen at the same time or when the projection screen is used as a front projection screen or a rear projection screen, users can view the background from the other side of the projection screen.

In one embodiment of the present invention, the proposed projection screen includes a substrate having a projection area for a projection device to project an image onto the projection area, wherein the projection area comprises a plurality of arrayed optical regions, at least one optical region is corresponding to one pixel of the image projected on the projection area, and each of the optical regions comprises a first optical sub-region and a second optical sub-region. The first optical sub-region has a first optical characteristic of reflective scattering, transmissive scattering or specular reflection, the second optical sub-region has a second optical characteristic of simple transmission, and the area of the second optical sub-region is larger than or equal to that of the first optical sub-region.

In another embodiment of the present invention, the proposed projection system comprises a projection device configured for projecting an image; and a projection screen comprising a substrate which has a projection area for the projection device to project the image onto the projection area, wherein the projection area comprises a plurality of arrayed optical regions, at least one optical region is corresponding to one pixel of the image projected on the projection area, and each of the optical regions comprises a first optical sub-region and a second optical sub-region. The first optical sub-region has a first optical characteristic of reflective scattering, transmissive scattering or specular reflection, the second optical sub-region has a second optical characteristic of simple transmission, and the area of the second optical sub-region is larger than or equal to that of the first optical sub-region.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
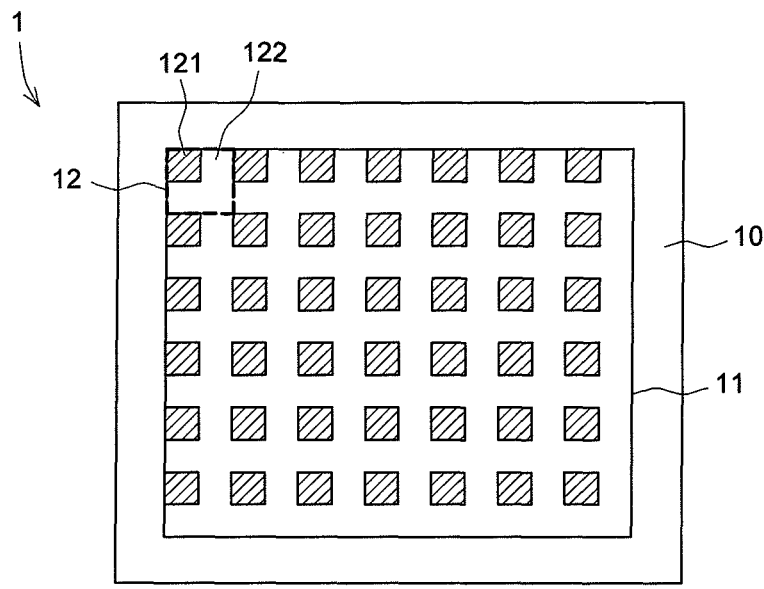
FIG. 1 is a diagram schematically illustrating a projection screen according to first embodiment of the present invention.
Figure 2:
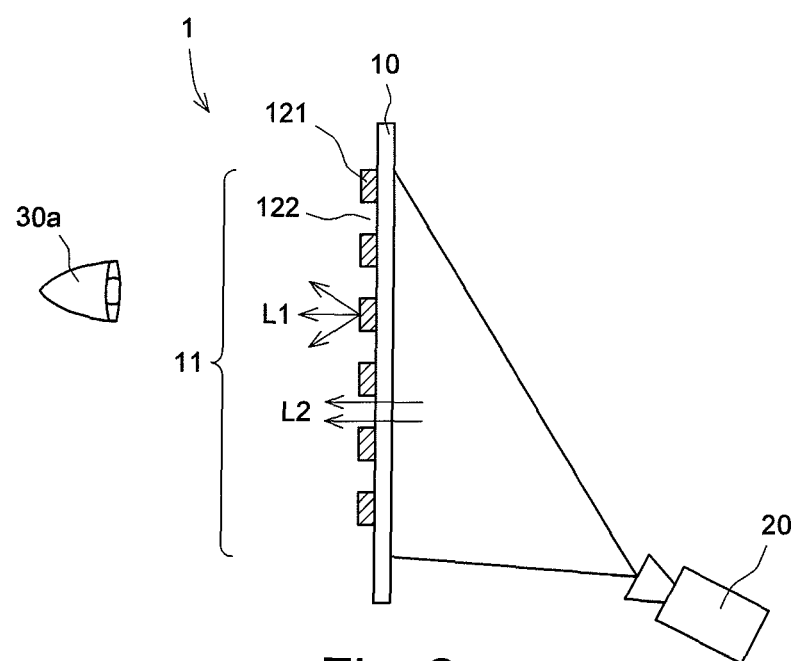
FIG. 2 is a diagram schematically illustrating a application of projection screen according to first embodiment of the present invention.

Referring to FIG. 1 and FIG. 2, in one embodiment of the present invention, the proposed projection screen 1 includes a substrate 10, which has a projection area 11 for a projection device 20 to project an image onto the projection area 11 of the projection screen 1. In one embodiment, the substrate 10 can be glass or polymers. For example, polymers can be polycarbonate, polyacrylic acid, polymethacrytic acid, polyacrylic ester, polyurethane, polyvinylchloride, polystyrene, polyolefin, cyclic olefin-based resin or polyethylene terephthalate.

The projection area 11 comprises a plurality of arrayed optical regions 12, and each pixel of the image is corresponding to the at least one optical region 12. Each of the optical regions 12 comprises a first optical sub-region 121 and a second optical sub-region 122, wherein the first optical sub-region 121 and the second optical sub-region 122 have different optical characteristics. In one embodiment, optical characteristics can be reflective scattering, transmissive scattering, simple transmission or specular reflection etc. By incorporating the first optical sub-region 121 and the second optical sub-region 122 with different optical characteristics together, types of projection screens can be designed for different uses.

Referring to FIG. 2, for example, the first optical sub-region 121 has a first optical characteristic of transmissive scattering, and the second optical sub-region 122 has a second optical characteristic of simple transmission. When the projection device 20 projects an image onto the projection area 11, the incident light of the image can transmit and diffuse from the first optical sub-region 121 to enable the viewer 30a to view the image projected onto the projection area 11, as light L1 showing. In this case, the projection screen 1 is considered as a rear projection screen. Besides, because the second optical sub-region 122 has an optical characteristic of simple transmission, the viewer 30a also can view the background from the other side of the projection screen 1, as light L2 showing.

It can be understood, by adjusting area ratio of the second optical sub-region 122 with the optical characteristic of simple transmission, transparency of the projection screen 1 can be controlled. In one embodiment, area of the second optical sub-region 122 is larger than that of the first optical sub-region 121. For example, in order to comply with traffic legislation or policy, the second optical sub-region 122 occupies 75% or above of the optical area 12. Additionally, optical characteristics of the first optical sub-region 121 can be changed for different usage.

Figure 3:
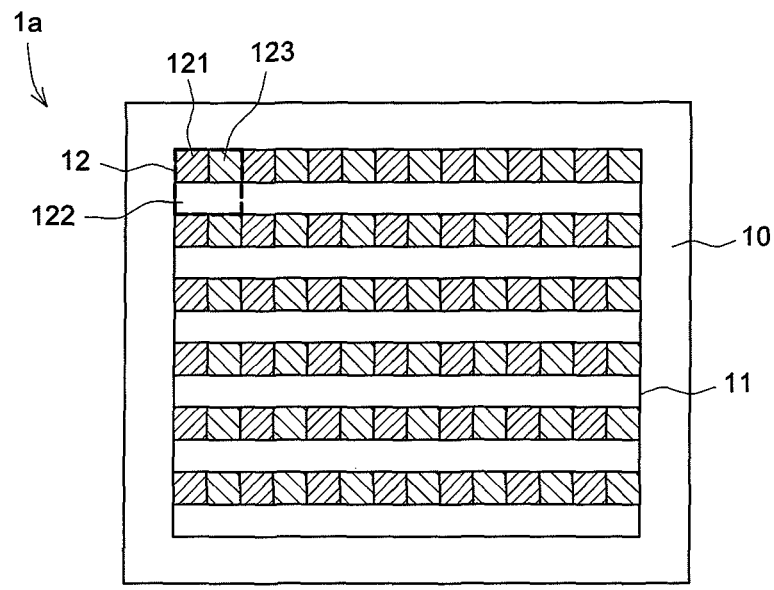
FIG. 3 is a diagram schematically illustrating a projection screen according to second embodiment of the present invention.
Figure 4:
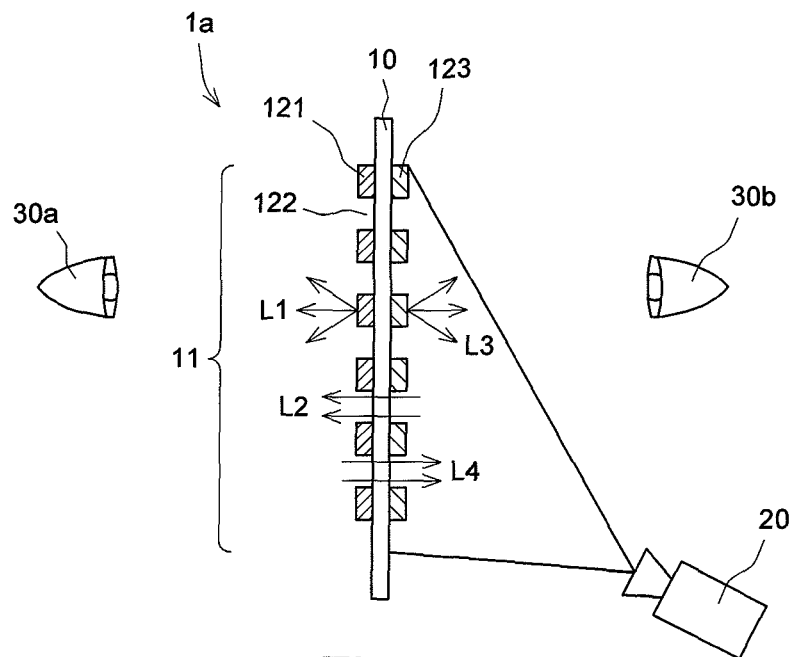
FIG. 4 is a diagram schematically illustrating a application of projection screen according to second embodiment of the present invention.

Referring to FIG. 3 and FIG. 4, in one embodiment of the present invention, each optical region 12 of the projection area 1a further comprises a third optical sub-region 123 having an optical characteristic different from the optical characteristics of the first optical sub-region 121 and the second optical sub-region 122. For example, the first optical sub-region 121 has a first optical characteristic of transmissive scattering, the second optical sub-region 122 has a second optical characteristic of simple transmission and the third optical sub-region 123 has a third optical characteristic of reflective scattering.

According to the structure mentioned above, when the projection device 20 projects an image onto the projection area 11, incident light of the image can transmit and diffuse from the first optical sub-region 121 to enable the viewer 30a to view the image projected onto the projection area 11, as light L1 showing. Incident light of the image can reflect and diffuse from the third optical sub-region 123 to enable viewer 30b to view the image projected onto the projection area 11, as light L3 showing. In this case, the projection screen 1a is considered as a rear projection screen and a front projection screen at the same time. Besides, because the second optical sub-region 122 has an optical characteristic of simple transmission, the viewers 30a and 30b are able to view each other, as light L2 and light L4 showing.

Figure 5:
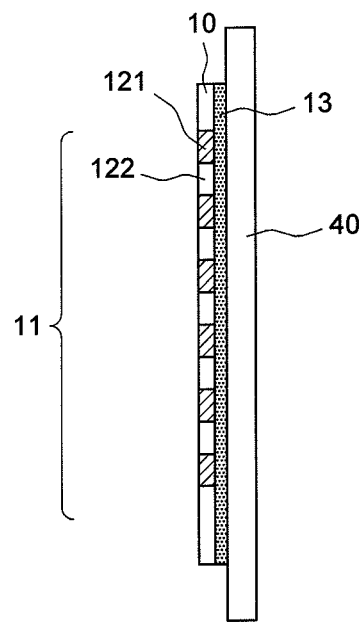
FIG. 5 is a diagram schematically illustrating a projection screen according to third embodiment of the present invention.

In one embodiment, the first optical sub-region 121 with the optical characteristic of transmissive scattering and the third optical sub-region 123 with the optical characteristic of reflective scattering are respectively arranged on opposite sides of the substrate 10. By this way, incident light can reflect from the surface of the same side where the projection device 20 is located. The optical characteristic of scattering can be implemented by a variety of suitable ways. For example, micro structure with curved surface or taper surface can be formed on the surface of the substrate 10 to scatter light. Otherwise, as shown in FIG. 5, scattering particles can be implanted into the substrate 10 to scatter light.

Figure 6:
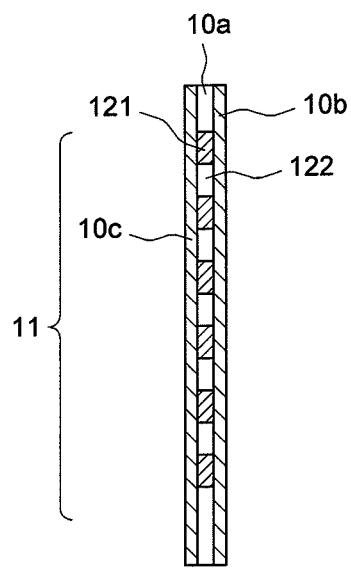
FIG. 6 is a diagram schematically illustrating a projection screen according to fourth embodiment of the present invention.

In one embodiment, optical characteristics of at least one of the first optical sub-region 121 and the second optical sub-region 122 is implemented by an optical modulation module which selectively changes the optical characteristics of at least one of the first optical sub-region 121 and the second optical sub-region 122 to reflective scattering/transmissive scattering/specular reflection or simple transmission. For example, referring to FIG. 6, the optical modulation module comprises a polymer dispersed liquid crystal (PDLC) layer 10a and two transparent electrodes 10b and 10c respectively arranged at opposite sides of the polymer dispersed liquid crystal layer 10a and selectively providing an electric field to change the optical characteristic of the polymer dispersed liquid crystal layer 10a. For example, the polymer dispersed liquid crystal layer 10a has an optical characteristic of reflective scattering or transmissive scattering when there is no electric field applied; and the polymer dispersed liquid crystal layer 10a has another optical characteristic of simple transmission when an electric field is applied.

Aforementioned embodiments use an electric field to selectively change optical characteristics of the optical modulation module between reflective scattering/transmissive scattering/specular reflection and simple transmission, but not limited to this. By using proper technique, optical characteristic of the optical modulation module also can be selectively changed between reflective scattering/transmissive scattering/specular reflection and simple transmission. Besides, area ratio of the first optical sub-region 121 and the second optical sub-region 122 can be adjusted by controlling the electric field to control optical characteristics (e.g. transparency) of the projection screen. It should be noticed that arrangement of the optical modulation module can cover entire or part of the projection area 11.

In one embodiment, the optical area 12, the first optical sub-region 121 and the second sub-region 122 can be the same or different in geometric shape. Geometric shapes can be circle or polygonal such as triangle, square or hexagonal etc. When one of the optical sub-regions has the optical characteristic of simple transmission, the other optical sub-region can be irregular in shape.

Referring to FIG. 5, in one embodiment, the projection screen of the present invention further comprises an adhesive layer 13 arranged on a surface of the substrate 10 for adhering the substrate 10 on a transparent material 40 according to user requirements, which makes the transparent 40 a projection screen. For example, the transparent material 40 can be glass of showcase or car windows.

Figure 7:
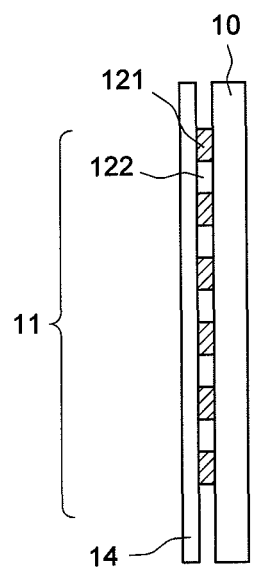
FIG. 7 is a diagram schematically illustrating a projection screen according to fifth embodiment of the present invention.

Referring to FIG. 7, in one embodiment, the projection screen of the present invention further comprises a protection layer 14 arranged on a surface of the substrate. The protection layer 14 can prevent the structure which contributes to optical characteristics from being damaged or change the surface properties of the substrate 10. For example, by means of deposing a protection layer 14 onto the surface of the micro structure, users can write on the projection screen without damaging the micro structure.

In conclusion, for the projection screen according to the present invention, each pixel of the projected image is corresponding to the at least one optical region, and each of the optical regions comprises at least two optical sub-regions and each of them has different optical properties such as reflective scattering, transmissive scattering, simple transmission or specular reflection. As a result, the projection screen of the present invention can be applied in a variety of applications. For example, the projection screen of the present invention can be used as a front projection screen and a rear projection screen at the same time or when the projection screen is used as a front projection screen a rear projection screen or a reflection screen of head-up display (HUD), users can view the background from the other side of the projection screen.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A projection screen comprising:
a substrate having a projection area for a projection device to project an image onto the projection area, wherein the projection area comprises a plurality of arrayed optical regions, at least one optical region is corresponding to one pixel of the image projected on the projection area, and each of the optical regions comprises a first optical sub-region and a second optical sub-region, wherein the first optical sub-region has a first optical characteristic of reflective scattering, transmissive scattering, or specular reflection, the second optical sub-region has a second optical characteristic of simple transmission, and the area of the second optical sub-region is larger than that of the first optical sub-region.

2. The projection screen according to claim 1, wherein each of the optical regions comprises a third optical sub-region having a third optical characteristic of reflective scattering, transmissive scattering, or specular reflection, and the third optical characteristic is different from the first optical characteristic and the second optical characteristic.

3. The projection screen according to claim 1, wherein the first optical characteristic of reflective scattering or transmissive scattering is implemented by microstructures or implanting scattering particles in the substrate.

4. The projection screen according to claim 1, wherein at least one of the first optical characteristic and the second optical characteristic is implemented by an optical modulation module which selectively changes the first optical characteristic or the second optical characteristic as reflective scattering/transmissive scattering/specular reflection or simple transmission.

5. The projection screen according to claim 4, wherein the optical modulation module comprises a polymer dispersed liquid crystal (PDLC) layer and two transparent electrodes respectively arranged at opposite site of the polymer dispersed liquid crystal layer and selectively providing an electric field to change the optical characteristic of the polymer dispersed liquid crystal layer.

6. The projection screen according to claim 1, wherein the optical region, the first optical sub-region and the second optical sub-region are the same or different in the shape of circle or polygon.

7. The projection screen according to claim 1, further comprises an adhesive layer arranged on a surface of the substrate for adhere the substrate on a transparent material.

8. The projection screen according to claim 1, further comprises a protection layer arranged on a surface of the substrate.

9. The projection screen according to claim 1, wherein the substrate is glass or polymer.

10. The projection screen according to claim 1, wherein the substrate is polycarbonate, polyacrylic acid, polymethacrytic acid, polyacrylic ester, polyurethane, polyvinylchloride, polystyrene, polyolefin, cyclic olefin-based resin or polyethylene terephthalate.

11. A projection system comprising:
a projection device configured for projecting an image; and
a projection screen comprising a substrate which has a projection area for the projection device to project the image onto the projection area, wherein the projection area comprises a plurality of arrayed optical regions, at least one optical region is corresponding to one pixel of the image projected on the projection area, and each of the optical regions comprises a first optical sub-region and a second optical sub-region, wherein the first optical sub-region has a first optical characteristic of reflective scattering, transmissive scattering, or specular reflection, the second optical sub-region has a second optical characteristic of simple transmission, and the area of the second optical sub-region is larger than that of the first optical sub-region.

12. The projection system according to claim 11, wherein each of the optical regions of the projection screen comprises a third optical sub-region having a third optical characteristic of reflective scattering, transmissive scattering or specular reflection, and the third optical characteristic is different from the first optical characteristic and the second optical characteristic.

13. The projection system according to claim 12, wherein the first optical characteristic or the second optical characteristic is implemented by an optical modulation module which selectively changes the first optical characteristic or the second optical characteristic as reflective scattering/transmissive scattering/specular reflection or simple transmission.

14. The projection system according to claim 13, wherein the optical modulation module comprises a polymer dispersed liquid crystal (PDLC) layer and two transparent electrodes respectively arranged at opposite site of the polymer dispersed liquid crystal layer and selectively providing an electric field to change the optical characteristic of the polymer dispersed liquid crystal layer.

* * * * *